United States Patent [19]

Tenhover et al.

[11] Patent Number: 4,746,584
[45] Date of Patent: May 24, 1988

[54] NOVEL AMORPHOUS METAL ALLOYS AS ELECTRODES FOR HYDROGEN FORMATION AND OXIDATION

[75] Inventors: Michael A. Tenhover, Solon; Robert K. Grasselli, Aurora, both of Ohio

[73] Assignee: The Standard Oil Company, Cleveland, Ohio

[21] Appl. No.: 747,985

[22] Filed: Jun. 24, 1985

[51] Int. Cl.$^4$ .............. B32B 15/01; C22C 19/05; C25B 11/04
[52] U.S. Cl. .............. 428/670; 428/660; 148/403; 204/290 R; 204/290 F
[58] Field of Search ........ 148/403; 428/606, 660, 428/670; 204/290 R, 290 F, 128

[56] References Cited

U.S. PATENT DOCUMENTS

| | | | |
|---|---|---|---|
| 3,856,513 | 12/1974 | Chen et al. | 75/122 |
| 4,036,638 | 7/1977 | Ray et al. | 75/123 B |
| 4,238,311 | 12/1980 | Kasuya | 204/290 R |
| 4,248,679 | 2/1981 | Welch et al. | 204/290 R |
| 4,323,595 | 4/1982 | Welch et al. | 204/290 R |
| 4,339,270 | 7/1982 | Hashimoto et al. | 148/403 |
| 4,498,962 | 2/1985 | Oda | 204/129 |
| 4,537,674 | 8/1985 | Ovshinsky et al. | 204/290 R |
| 4,545,883 | 10/1985 | Ovshinsky et al. | 204/290 F |
| 4,560,454 | 12/1985 | Harris et al. | 148/403 |
| 4,609,442 | 9/1986 | Tenhover et al. | 240/290 R |

FOREIGN PATENT DOCUMENTS

| | | |
|---|---|---|
| 105454 | 1/1980 | Japan . |
| 105453 | 1/1980 | Japan . |
| 150148 | 4/1980 | Japan . |
| 107439 | 12/1981 | Japan . |
| 2023177 | 5/1979 | United Kingdom . |

Primary Examiner—L. Dewayne Rutledge
Assistant Examiner—David W. Schumaker
Attorney, Agent, or Firm—Joseph G. Curatolo; Larry W. Evans

[57] ABSTRACT

Novel amorphous metal alloy electrodes have the formulae $$Pt_p A_a D_d$$

where
A is Ir, Pd, Rh, Ru and mixtures thereof;
D is B, Al, As, P, Sb, Ge, Sn, Si and mixtures thereof;
p is from about 40 to 92 percent;
a is from about 1 to 40 percent;
d is from about 8 to 40 percent; and p+a+d=100; and $$Ni_n E_e F_f G_g$$

where
E is Mo, W and mixtures thereof;
F is Pt, Pd, Rh, Ir, Cr and mixtures thereof;
G is Al, Ga and mixtures thereof;
n is from about 30 to 90 percent;
e is from about 10 to 50 percent;
f is from about 0 to 25 percent;
g is from about 10 to 40 percent; and n+e+f+g=100.

These electrodes are useful for hydrogen formation and oxidation and operate at lower potentials than existing electrodes.

10 Claims, No Drawings

NOVEL AMORPHOUS METAL ALLOYS AS ELECTRODES FOR HYDROGEN FORMATION AND OXIDATION

TECHNICAL FIELD

The present invention is directed toward novel amorphous metal alloys which are electrically conductive and have utility as electrodes for hydrogen formation in aqueous media as well as the reverse process, oxidation of hydrogen. Amorphous metal alloy materials have become of interest in recent years due to their unique combinations of mechanical, chemical and electrical properties which are specially well suited for newly emerging applications. Amorphous metal materials have compositionally variable properties, high hardness and strength, flexibility, soft magnetic and ferroelectronic properties, very high resistance to corrosion and wear, unusual alloy compositions, and high resistance to radiation damage. These characteristics are desirable for applications such as low temperature welding alloys, magnetic bubble memories, high field superconducting devices and soft magnetic materials for power transformer cores.

BACKGROUND ART

The unique combination of properties possessed by amorphous metal alloy materials may be attributed to the disordered atomic structure of amorphous materials which ensures that the material is chemically homogeneous and free from the extended defects that are known to limit the performance of crystalline materials.

Generally, amorphous materials are formed by rapidly cooling the material from a molten state. Such cooling occurs at rates on the order of $10^{6°}$ C./second. Processes that provide such cooling rates include sputtering, vacuum evaporation, plasma spraying and direct quenching from the liquid state. Direct quenching from the liquid state has found the greatest commercial success inasmuch as a variety of alloys are known that can be manufactured by this technique in various forms such as thin films, ribbons and wires.

U.S. Pat. No. 3,856,513 describes novel metal alloy compositions obtained by direct quenching from the melt and includes a general discussion of this process. The patent describes magnetic amorphous metal alloys formed by subjecting the alloy composition to rapid cooling from a temperature above its melting temperature. A stream of the molten metal was directed into the nip of rotating double rolls maintained at room temperature. The quenched metal, obtained in the form of a ribbon, was substantially amorphous as indicated by X-ray diffraction measurements, was ductile, and had a tensile strength of about 350,000 psi (2415 MPa).

U.S. Pat. No. 4,036,638 describes binary amorphous alloys of iron or cobalt and boron. The claimed amorphous alloys were formed by a vacuum melt-casting process wherein molten alloy was ejected through an orifice and against a rotating cylinder in a partial vacuum of about 100 millitorr. Such amorphous alloys were obtained as continuous ribbons and all exhibit high mechanical hardness and ductility.

U.S. Pat. No. 4,339,270 discloses a variety of ternary amorphous metal alloys consisting of 10 to 40 atomic percent phosphorus and/or silicon and 90 to 60 atomic percent of two or more of palladium, rhenium and platinum. Additional elements that can be present include titanium, zirconium, niobium, tantalum and/or iridium. The alloys can be used as electrodes for electrolysis and the patent reports high corrosion resistance in the electrolysis of halide solutions.

The amorphous metal alloys described hereinabove have not been suggested for usage as electrodes for hydrogen formation in distinction from the alloys utilized for practice of the present invention. With respect to other electrolytic processes, such as chlorine evolution from sodium chloride solutions for instance, certain palladium-phosphorus based metal alloys have been prepared and their anodic characteristics studied by the researchers, M. Hara, K. Hashimoto and T. Masumoto and reported in various journals. One such publication entitled "The Anodic Polarization Behavior of Amorphous Pd-Ti-P Alloys in NaCl Solution" *Electrochimica Acta*, 25, pp. 1215–1220 (1980) describes the reaction of palladium chips and phosphorus at elevated temperatures to form palladium phosphide which is then melted with titanium. The resulting alloy was then formed into ribbons 10 to 30 microns in thickness by the rotating wheel method.

"Anodic characteristics of amorphous ternary palladium-phosphorus alloys containing ruthenium, rhodium, iridium, or platinum in a hot concentrated sodium chloride solution", reported in the *Journal of Applied Electrochemistry* 13, pp. 295–306 (1983) describes the entitled alloys, again prepared by the rotating wheel method from the molten state. Palladium-silicon alloys were also prepared and evaluated but were found to be unsatisfactory as anodes. The reported anode alloys were found to be more corrosion resistant and had a higher chlorine activity and lower oxygen activity than DSA.

Lastly, "Anodic Characteristics of Amorphous Palladium-Iridium-Phosphorus Alloys in a Hot Concentrated Sodium Chloride Solution" reported in *Journal of Non-Crystalline Solids*, 54, pp. 85–100 (1983) describes such alloys also prepared by the rotating wheel method. Again, moderate corrosion resistance, high chlorine activity and low oxygen activity were reported. The authors found that the electrocatalytic selectivity of these alloys was significantly higher than that of the known dimensionally stable anodes (DSA) consisting of an oxide mixture of ruthenium and titanium supported by metallic titanium.

Thus, while amorphous metal alloys have been prepared heretofore and employed as alloys in chlorine evolution processes, there has not been a teaching heretofore of the use of novel amorphous alloys as electrodes for hydrogen formation. Although the novel amorphous alloys of the present invention have favorable anodic activity for the electrolysis of halide-containing electrolyte solutions, the present invention is directed toward their use as electrodes for hydrogen formation and for oxidation. The specific amorphous alloys disclosed herein are platinum or nickel based and extremely corrosion resistant.

SUMMARY OF THE INVENTION

The amorphous metal alloys of the present invention that can be utilized as electrodes for hydrogen formation have the formulae $$Pt_p A_a D_d \qquad \qquad I$$

where
  A is Ir, Pd, Rh, Ru and mixtures thereof;

D is B, Al, As, P, Sb, Ge, Sn, Si and mixtures thereof;
p is from about 40 to 92 percent;
a is from about 1 to 40 percent;
d is from about 8 to 40 percent; and $$p+a+d=100;\text{ and}$$

$$Ni_nE_eF_fG_g \quad\quad\quad\quad II$$

where
E is Mo, W and mixtures thereof;
F is Pt, Pd, Rh, Ir, Cr and mixtures thereof;
G is Al, Ga and mixtures thereof;
n is from about 30 to 90 percent;
e is from about 10 to 50 percent;
f is from about 0 to 25 percent;
g is from about 10 to 40 percent; and
$n+e+f+g=100$.

The amorphous metal alloys of formula I are employed in acidic salt solutions having a pH$\leq$7, typical acids being sulfuric, hydrochloric, nitric, phosphoric and the like, and the amorphous metal alloys of formula II are employed in basic solutions having a pH>7, typical bases including sodium hydroxide, calcium hydroxide and the like.

PREFERRED MODE FOR CARRYING OUT THE INVENTION

In accordance with the present invention, novel platinum or nickel based amorphous metal alloys are utilized as electrodes for hydrogen formation in aqueous media. The electrolysis is accomplished by the application of a cathodic voltage to the electrode from a suitable power source or by short circuiting the electrode to another contained within a different cell, which in turn contains a redox couple with sufficient driving force to effect electrolysis. The amorphous electrodes can also be employed for the reverse process, the oxidation of hydrogen for example, in a fuel cell type design.

The amorphous alloy electrodes of the present invention have the formulae $$Pt_pA_aD_d \quad\quad\quad\quad I$$

where
A is Ir, Pd, Rh, Ru and mixtures thereof;
D is B, Al, As, P, Sb, Ge, Sn, Si and mixtures thereof;
p is from about 40 to 92;
a is from about 1 to 40 percent;
d is from about 8 to 40 percent; and $p+a+d=100$; and $$Ni_nE_eF_fG_g \quad\quad\quad\quad II$$

where
E is Mo, W and mixtures thereof;
F is Pt, Pd, Rh, Ir, Cr and mixtures thereof;
G is Al, Ga and mixtures thereof;
n is from about 30 to 90 percent;
e is from about 10 to 50 percent;
f is from about 0 to 25 percent;
g is from about 10 to 40 percent; and
$n+e+f+g=100$.

The foregoing metal alloys can be ternary or quaternary. The use of the phrase "amorphous metal alloys" herein refers to amorphous metal-containing alloys that may also comprise one or more of the foregoing non-metallic elements. Amorphous metal alloys may thus include non-metallic elements such as boron, silicon, phosphorus, arsenic, germanium and antimony. Several preferred combinations of elements include Pt/B; Pt/Si; Pt/Ir/Pd/B; Ni/Mo/Pd/Al; Ni/Mo/Al and Ni/Cr/Mo/Al. The foregoing list is not to be construed as limiting but merely exemplary.

These alloys can be prepared by any of the standard techniques for fabricating amorphous metal alloys. Thus, any physical or chemical method, such as electron beam evaporation, chemical and/or physical decomposition, ioncluster, ion plating, liquid quench or R.F. and D.C. sputtering process can be utilized. The amorphous alloy can be either solid, powder or thin film form, either free standing or attached to a substrate. Trace impurities such as O, N, C, S, Se, Te and Ar are not expected to be seriously detrimental to the preparation and performance of the materials. The only restriction on the environment in which the materials are prepared or operated is that the temperature during both stages be lower than the crystallization temperature of the amorphous metal alloy.

The amorphous metal alloys of the present invention are utilized as coatings on substrate metals to form the electrodes. Preferred substrate metals for use as the electrode are nickel, titanium and stainless steel although other metals and various non-metals are also suitable. The substrate is useful primarily to provide support for the amorphous metal alloys and therefore can also be a nonconductor of semi-conductor material. The coating is readily deposited upon the substrate by sputtering, as is exemplified hereinbelow. Coating thicknesses are not crucial and may range broadly, for example, up to about 100 microns although other thicknesses are not necessarily precluded so long as they are practical for their intended use. A useful thickness, exemplified in the work hereinbelow, is 3000 Å.

As will be appreciated, the desired thickness is somewhat dependent upon the process of preparation of the electrode and somewhat upon the intended use. Thus, a free-standing or non-supported electrode, as prepared by liquid quenching, may have a thickness of approximately 100 microns. Or an amorphous alloy electrode can be prepared by pressing the amorphous alloy, in powder form, into a predetermined shape and can also be thick enough to be free-standing. Where a sputtering process is employed, relatively thin layers can be deposited and these would be preferably supported by a suitable substrate, as noted hereinabove. Thus, it is to be understood that the actual electrode of the present invention is the amorphous metal alloy whether supported or unsupported. Where a very thin layer is employed, a support may be convenient or even necessary to provide integrity.

Irrespective of the use of the amorphous metal alloys, as a coating or a solid product, the alloys are substantially amorphous. The term "substantially" as used herein in reference to the amorphous metal alloy means that the metal alloys are at least fifty percent amorphous. Preferably the metal alloy is at least eighty percent amorphous and most preferably about one hundred percent amorphous, as indicated by X-ray diffraction analysis.

In the examples which follow, three platinum based and three nickel based amorphous metal alloys were prepared via radio frequency sputtering in argon gas. A 2" Research S-Gun, manufactured by Sputtered Films, Inc. was employed. As is known, DC sputtering can also be employed. For Examples No. 1 to 3, a titanium substrate was positioned to receive the deposition of the sputtered amorphous alloy; for Examples No. 4 to 6, a nickel substrate was employed. The distance between the target and the substrate in each instance was approximately 10 cm. The composition of each alloy was verified by X-ray analysis and was amorphous thereto.

TABLE I

Amorphous Metal Alloy Electrodes

| Example No. | Alloy |
|---|---|
| 1 | $Pt_{82}B_{18}$ |
| 2 | $Pt_{80}Si_{20}$ |
| 3 | $Pt_{52}Ir_{20}Pd_{10}B_{18}$ |
| 4 | $Ni_{50}Mo_{20}Pd_{10}Al_{20}$ |
| 5 | $Ni_{60}Mo_{20}Al_{20}$ |
| 6 | $Ni_{50}Cr_{10}Mo_{20}Al_{20}$ |

As noted hereinabove, the platinum based amorphous metal alloy electrodes are employed in acid solutions, pH≦7, viz., salts of mineral acids such as sulfuric, hydrochloric, nitric, phosphoric and the like, while the nickel based amorphous metal alloy electrodes are employed in basic solutions, ph>7, such as sodium and potassium hydroxide and the like.

The six alloys reported in Table I were each separately employed in a 1M solution of $Na_2SO_4$ or a 0.5N solution of NaOH for the formation of hydrogen by the application of a cathodic voltage in a potentiostatic mode or by application of a constant current in a galvanostatic mode. The potentiostatic mode requires a standard 3-electrode cell, while the galvanostatic mode requires only a 2-electrode cell, either of which can be similar to those currently employed in the art.

For comparison, three separate electrodes were also evaluated: crystalline nickel, stainless steel and crystalline platinum. In each instance, it can be seen from the voltages reported in Table II that the nickel based amorphous metal alloys of the present invention required less voltage than the nickel or steel electrodes in a basic solution and the platinum based amorphous metal alloys of the present invention required the same or less voltage than the crystalline platinum electrode in an acid solution.

TABLE II

Platinum and Nickel Based Electrodes For the Formation of Hydrogen

| Example No. | Electrolyte | Voltage (SCE) (Volts) |
|---|---|---|
| 1 | 1 M $Na_2SO_4$ pH = 2.0 | −0.710 |
| 2 | 1 M $Na_2SO_4$ pH = 2.0 | −0.690 |
| 3 | 1 M $Na_2SO_4$ pH = 2.0 | −0.714 |
| 4 | 0.5 N NaOH | −1.210 |
| 5 | 0.5 N NaOH | −1.190 |
| 6 | 0.5 N NaOH | −1.215 |
| Crystalline Ni | 0.5 N NaOH | −1.430 |
| Mild Steel | 0.5 N NaOH | −1.490 |
| Crystalline Pt | 1 M $Na_2SO_4$ pH = 2.0 | −0.705 |

In conclusion, although six amorphous metal electrodes have been exemplified herein, it will readily be appreciated by those skilled in the art that other amorphous metal alloys could be substituted therefor as an electrode of the present invention for virtually any electrolytic process where hydrogen is formed or oxidized.

It is to be understood that the foregoing examples have been provided to enable those skilled in the art to have representative examples by which to evaluate the invention and that these examples should not be construed as any limitation on the scope of this invention. Inasmusch as the composition of the amorphous metal alloy electrodes of the present invention can be varied within the scope of the total specification disclosure, neither the particular A, D E, F or G components nor the relative amounts of the components in the alloys exemplified herein shall be construed as limitations of the invention.

Furthermore, while the exemplified alloys were prepared by sputtering techniques, it is to be understood that neither the processes of preparation nor the coating of substrates are to be construed as limitations of the present invention, inasmuch as the electrodes can be prepared by other processes and have other forms.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

We claim:

1. An anode comprising:
a substrate material; and
an amorphous metal alloy coated on said substrate having the formula $Ni_nE_eF_fG_g$ where
E is Mo, W, Cr and mixtures thereof;
F is Pt, Pd, Rh, Ir and mixtures thereof;
G is Al, Ga and mixtures thereof;
n is from about 30 to 90 percent;
e is from about 10 to 50 percent;
f is from about 0 to 25 percent;
g is from about 10 to 40 percent; and
n+e+f+g=100, with the proviso that when E is Mo, G is Ga and when G is Al, E is W, Cr and mixtures thereof.

2. An anode, as set forth in claim 1, wherein said amorphous metal alloy is at least 60 percent amorphous.

3. An anode, as set forth in claim 1, wherein said amorphous metal alloy is at least 80 percent amorphous.

4. An anode, as set forth in claim 1, wherein said amorphous metal alloy is about 100 percent amorphous.

5. An anode, as set forth in claim 1, comprising Ni, Mo, Pd and Al.

6. An anode, as set forth in claim 5, comprising $Ni_{50}Mo_{20}Pd_{10}Al_{20}$.

7. An anode, as set forth in claim 1, comprising Ni, Mo and Al.

8. An anode, as set forth in claim 7, comprising $Ni_{60}Mo_{20}Al_{20}$.

9. An anode, as set forth in claim 1, comprising Ni, Cr, Mo and Al.

10. An anode, as set forth in claim 9, comprising $Ni_{50}Cr_{10}Mo_{20}Al_{20}$.

* * * * *